United States Patent [19]

Carobolante

[11] Patent Number: 5,566,369
[45] Date of Patent: Oct. 15, 1996

[54] CONTROLLED VELOCITY HEAD PARKING CIRCUIT

[75] Inventor: Francesco Carobolante, Portola Valley, Calif.

[73] Assignee: SGS-Thomson Microelectronics, Inc., Carrollton, Tex.

[21] Appl. No.: 365,921

[22] Filed: Dec. 29, 1994

[51] Int. Cl.[6] .............................. G11B 21/02; G11B 5/54; G05B 11/01; H02P 7/00
[52] U.S. Cl. ............................ 360/75; 360/105; 318/560; 318/432
[58] Field of Search ..................... 360/75, 105; 318/560, 318/563, 432

[56] References Cited

U.S. PATENT DOCUMENTS

| | | | |
|---|---|---|---|
| 4,751,595 | 6/1988 | Kishi et al. | 360/105 |
| 4,786,995 | 11/1988 | Stupeck et al. | 360/75 |
| 5,384,524 | 1/1995 | Romano | 360/75 |

FOREIGN PATENT DOCUMENTS

537916A2  4/1993  European Pat. Off. ................ 360/75

OTHER PUBLICATIONS

Allegro MicroSystems, Inc., May 27, 1992, Voice Coil Motor Driver 8932-A Product Specification.

Primary Examiner—Won Tae C. Kim
Assistant Examiner—Regina Y. Neal
Attorney, Agent, or Firm—Joseph C. Arrambide; Theodore E. Galanthay; Lisa K. Jorgenson

[57] ABSTRACT

A constant velocity head parking circuit is disclosed. The circuit includes a voice coil motor, a sense resistor, a park voltage source, and a feedback loop. The feedback loop includes a scaling circuit which can be constructed with an op amp and two resistors. The scaling circuit adds a voltage to the park voltage so that any voltage loses in the voice coil motor are compensated for.

9 Claims, 2 Drawing Sheets

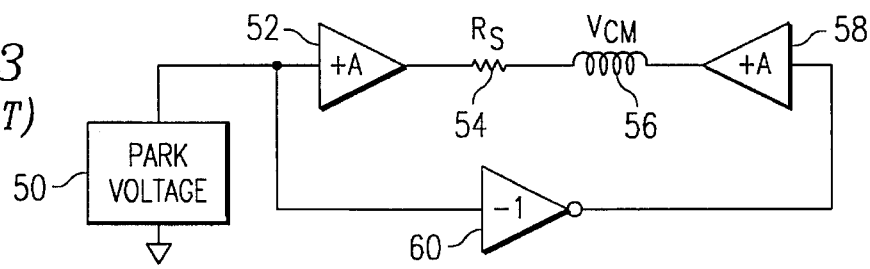
FIG. 3 (PRIOR ART)
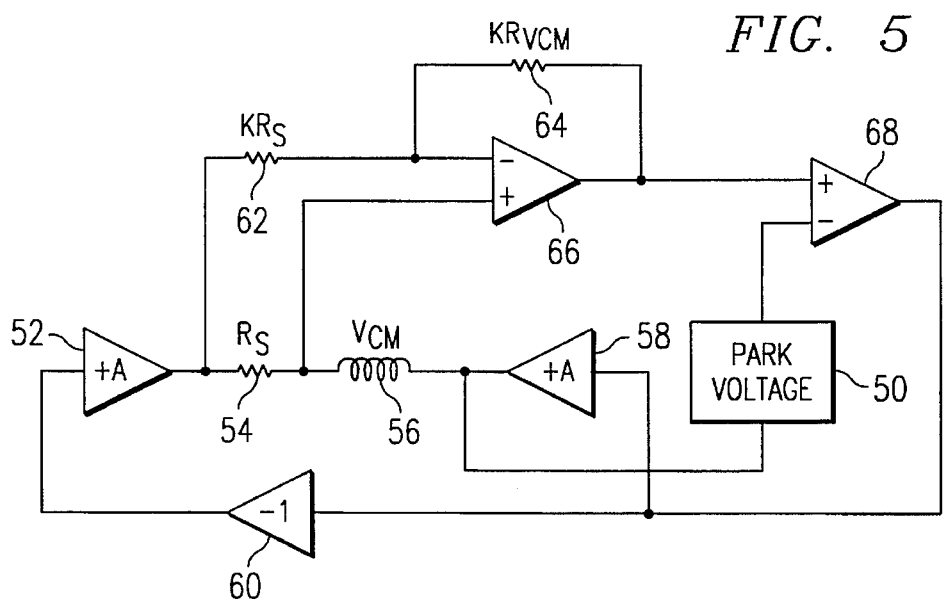
FIG. 4
FIG. 5

CONTROLLED VELOCITY HEAD PARKING CIRCUIT

BACKGROUND OF THE INVENTION

1. Field of the Invention

This invention relates generally to hard disk drives of the type generally used with microcomputers for storing digital data and more specifically to parking the heads in a disk drive at a controlled velocity.

2. Description of the Relevant Art

The problem addressed by this invention is encountered in disk drives used to store data in computers. FIG. 1 shows a block diagram of a typical disk drive system as is known in the prior art. More specifically, FIG. 1 shows a disk drive system comprised of a disk drive microprocessor 8, control logic 10, voltage fault detector 12, voice coil motor drivers 14, voice coil motor 16, read/write head electronics 18 head carriage 20, read/write heads 21, magnetic media 22, spindle motor 24, and spindle motor drivers 26. In operation, host computer 4 communicates through controller 6 to send and receive commands and/or data to the disk drive microprocessor 8. Responsive to these commands, the disk drive system rotates the spindle motor 24, and thus the magnetic media 22, at a substantially constant velocity. The voice coil motor 16 moves the heads 21 to specific tracks over the magnetic media 22. Once the heads have stabilized over the appropriate tracks, the heads can read data from the magnetic media or can write data on the media, as is known in the industry.

In a disk drive systems such as the one described in FIG. 1, the magnetic media 22 rotates at high velocities and the heads 21 fly at very close distances to the magnetic media 22. In this environment, designers are concerned about the head making contact with the media (a head crash) since such contact can have catastrophic results. Data can be permanently lost. Even worse, the heads or the media can be damaged such that the entire disk no longer functions. Therefore, virtually all modern disk drives design their systems to avoid as much head contact with the media as possible. To this end, many disk drives park their read/write heads when the disk drive is powered down so that the heads land on a parking zone instead of the area of the disk which has data. A parking zone is an area of the magnetic media where data is not stored which is typically the innermost tracks of the magnetic media. This minimizes the wear on the magnetic media where data is stored and thus increases the reliability of the disk drive and the integrity of the data.

FIG. 2 shows the schematic of a typical head parking circuit, as is known in the prior art. In this circuit, the voice coil motor 36 is controlled by the H-bridge formed by n-channel transistors 32, 34, 38, and 40, which collectively are the VCM drivers 14 of FIG. 1. When disk drive system is on, the gates of transistors 32, 34, 38, and 40 are connected control logic 10 as shown in FIG. 1 and are provided with the necessary signals to position the heads to a desired track. FIG. 2 shows the appropriate voltage signals to the VCM drivers for the VCM 36 to park the heads. More specifically, FIG. 2 shows a park voltage source 30 providing a park voltage to the A node of the VCM 36. The B node is connected to a voltage reference, ground, through transistor 40 and sense resistor 42. The park voltage can be supplied from the back electromotive force (BEMF) of the spindle motor as it spins down or from storage device such as a capacitor as is known in the art. A constant park voltage will accelerate the heads to a velocity where the BEMF generated by the movement of the heads plus the voltage drop due to the resistance of the VCM (times the current) is equal to the park voltage.

In this circuit, the park voltage is approximately equal to the voltage drop across the VCM 36 and the voltage drop across the sense resistor. The voltage drop across the VCM 36 is approximately equal to the voltage drop due to the back electromotive force (BEMF) due to the movement of VCM 36, plus the voltage drop due to the resistive losses in the VCM. Thus, assuming the voltage drop across transistor 40 is negligible, the equation for this relation can be simplified as:

$$V_{park\ voltage} = V_{VCM\ BEMF} + I(t)R_{VCM} + I(t)R_{SENSE\ RESISTOR}$$

where $V_{VCM\ BEMF}$=the voltage of VCM 36 due to the BEMF.

$I(t)R_{VCM}$=the resistive voltage drop of VCM 36 as a function of current I(t).

$I(t)R_{SENSE\ RESISTOR}$=the resistive voltage drop of the sense resistor as a function of the current I(t).

The equation also indirectly shows that $V_{VCM\ BEMF}$ is not precisely controlled. Since the current to achieve a given velocity is not precisely known, the BEMF which will result is not accurately defined by this circuit. Also, this circuit will asymptotically reach its target speed, but not very fast.

FIG. 3 shows a schematic diagram of a second head parking circuit as is known in the prior art. In this circuit, the voice coil motor 56 is controlled by the voice coil motor drivers 52 and 58, which collectively are the VCM drivers 14 of FIG. 1. When the disk drive system is on, the inputs of amplifiers 52 and 60 (through inverter amplifier 8) are connected to control logic 10 as shown in FIG. 1 and are provided with the necessary signals to position the heads to a desired track. FIG. 3 shows the schematic of the circuit when the power is turned off. A park voltage source 50 providing a park voltage to the input of amplifier 52 and to the input of inverting amplifier 60. The output of inverting amplifier 60 is connected to amplifier 58 so that amplifier 58 provides a current which is equal and opposite to the current provided by amplifier 52. Sense resistor 54 is connected in series to the VCM 56.

Assuming unity gain for amplifiers 52 and 58, the park voltage can be made to be approximately equal to the voltage drop across the VCM 56 and the voltage drop across the sense resistor 54. The voltage drop across the VCM 56 is approximately equal to the voltage drop due to the back electromotive force (BEMF) due to the movement of VCM 36, plus the voltage drop due to the resistive losses in the VCM. Thus, the equation for this relation can be simplified as:

$$V_{park\ voltage} = V_{VCM\ BEMF} + I(t)R_{VCM} + I(t)R_{SENSE\ RESISTOR}$$

where, $V_{VCM\ BEMF}$=the voltage of VCM 36 due to the BEMF.

$I(t)R_{SENSE\ RESISTOR}$=the resistive voltage drop of VCM 36 as a function of current I(t).

$I(t)R_{VCM}$=the resistive voltage drop of the sense resistor as a function of the current I(t).

Like the circuit in FIG. 2, the equation also indirectly shows that $V_{VCM\ BEMF}$ is not precisely controlled. Since the current to achieve a given velocity is not precisely known, the BEMF which will result is not accurately defined by this circuit. Also, this circuit will asymptotically reach its target speed, but not very fast. A circuit which controls the BEMF (i.e. the speed of the VCM) provides both a more accurate velocity and a faster settling time at the desired velocity.

SUMMARY OF THE INVENTION

Therefore, it is an object of the invention to provide a circuit for parking the heads in a disk drive at a precisely controlled velocity.

It is further an object of this invention to provide a circuit for with a faster settling time.

These and other objects, features, and advantages of the invention will be apparent to those skilled in the art from the following detailed description of the invention, when read with the drawings and appended claims.

BRIEF DESCRIPTION OF THE DRAWING

FIG. 3 is a schematic drawing of a head parking circuit using VCM class AB amplifiers for the voice coil motor drivers, as known in the prior art.

FIG. 4 is an schematic drawing of a constant velocity head parking circuit using an H-bridge configuration for the voice coil motor drivers of the present invention.

FIG. 5 is a schematic drawing of a constant velocity head parking circuit using VCM amplifiers for the voice coil motor drivers of the present invention.

DETAILED DESCRIPTION OF THE PREFERRED EMBODIMENT

Figure 1:
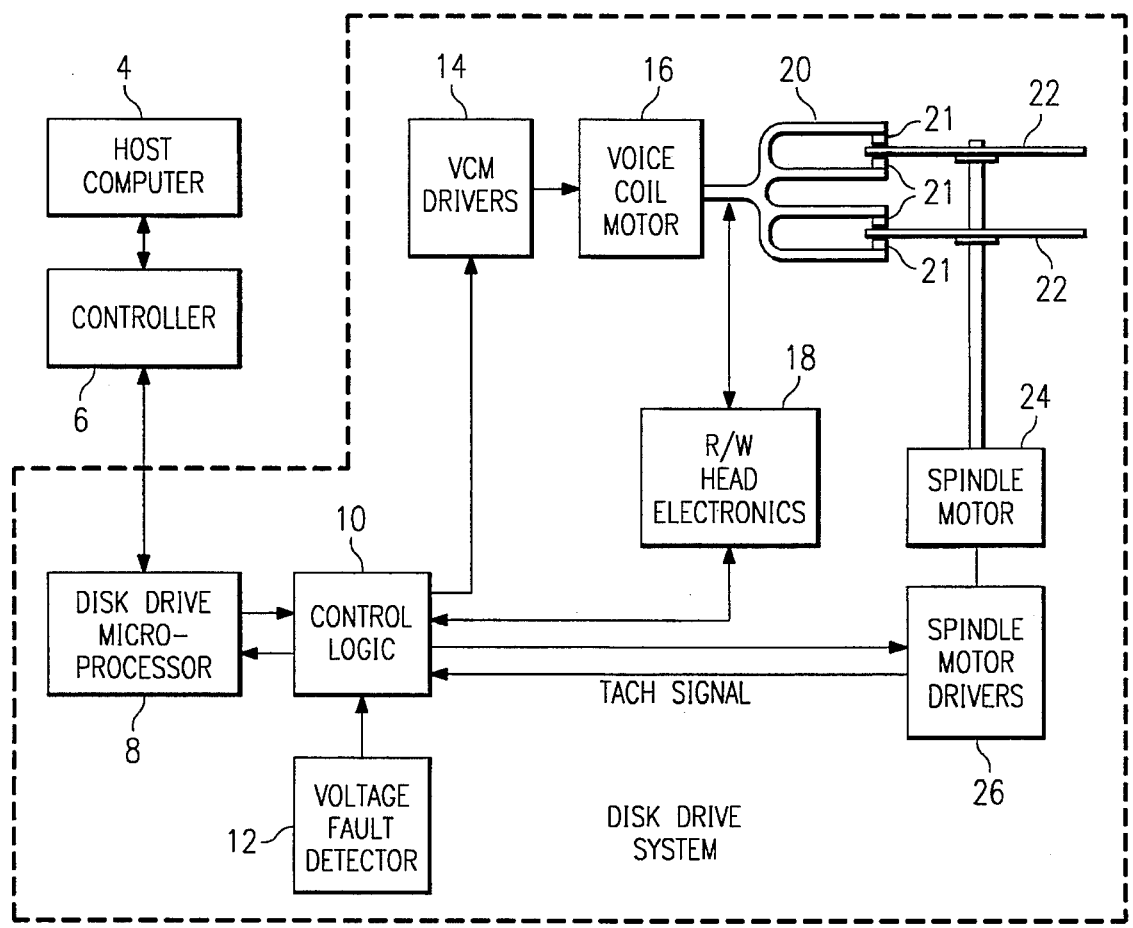
FIG. 1 is an block diagram of a disk drive system as known in the prior art.
Figure 2:
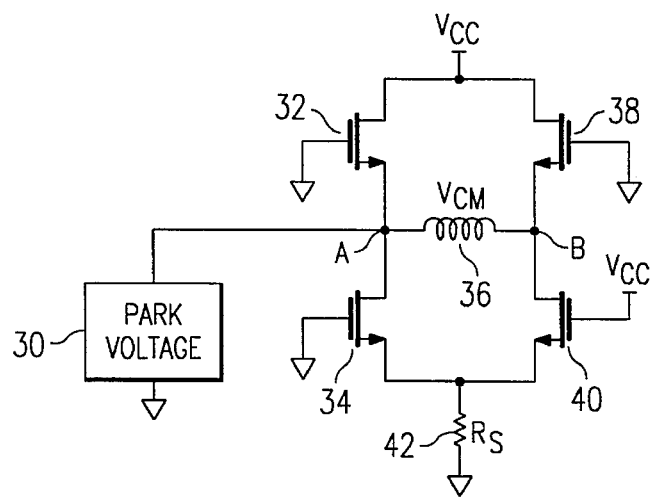
FIG. 2 is an schematic drawing of a head parking circuit using an H-bridge configuration for the voice coil motor drivers, as known in the prior art.

A controlled velocity head parking circuit constructed according to an embodiment of the invention will be described. Referring now to FIG. 4, the constant velocity head parking circuit is constructed by connecting the first end of park voltage source 30 to a first end of VCM 36, to a source of n-channel transistor 32, and to a drain of n-channel transistor 34. The second end of VCM 36 is connected to a source of n-channel transistor 38, and to a drain of n-channel transistor 40. The drains of transistors 32 and 38 are connected to a voltage source Vdd. The sources of transistors 34 and 40 are connected to a first end of a sense resistor 42. The second end of sense resistor 42 is connected to a voltage reference, ground.

The feedback loop comprises amplifier 48, resistor 44, and resistor 46 and is constructed by connecting the non-inverting input of amplifier 48 to the first end of sense resistor 42. The output of amplifier 48 is connected to the second end of the park voltage 30 and to the first end of resistor 46. Resistor 46 is selected so that it is a multiple K of the resistance of the VCM 36. The second end of resistor 46 is connected to the inverting input of amplifier 48 and to the first end of resistor 44. The second end of resistor 44 is connected to ground. The resistance of resistor 44 is selected to have resistance which is a K multiple of the resistance of the sense resistor. Therefore, the output of the feedback loop-is substantially equal to the voltage drop across R sense and the voltage drop due to the resistance of VCM 36.

In operation, the current through VCM 36 is controlled by the H-bridge configured by n-channel transistors 32, 34, 38, and 40. During the park operation, a park voltage is supplied by the park voltage source 30 to the VCM 36. The feedback loop created by amplifier 48, resistor 44 and 46 compensates for the voltage drop due to the resistive component of the VCM 36 by adding the voltage drop due to the resistive component back into the park voltage source. By adding the VCM resistive drop into the park voltage 30, the park voltage is forced to be equal to the BEMF which insures that park velocity is constant.

More specifically, the feedback circuit is a scaling circuit which, in general terms, senses the voltage drop across the sense resistor 42 adjusts the voltage in proportion to R46 relative to R44. Since the resistance of VCM 36 ($R_{VCM}$)/R42=R46/R44, the voltage at the output of the feedback loop (amplifier 48) is approximately equal to the voltage drop due to the resistive component of the VCM 36 and the sense resistor 42. The output voltage of the feedback loop (amplifier 48) is added to the park voltage so that the park voltage is always equal to BEMF of VCM, which insures a constant velocity. Therefore, this embodiment of the invention is advantageous over the prior art since the heads are retracted at a controlled velocity. Additionally, the heads settle at the controlled velocity much quicker.

A controlled velocity head parking circuit constructed according to another embodiment of the invention will be described. Referring now to FIG. 5, the constant velocity head parking circuit is constructed by connecting the output of amplifier 52 to the first end of sense resistor 54 and to the first end of resistor 62. The second end of resistor 54 is connected to the first end of the voice coil motor 56 and to the non-inverting input of amplifier 66. The second end of resistor 62 is connected to the inverting input of amplifier 66 and the first end of resistor 64. The second end of resistor 64 is connected to the output of amplifier 66 and to the non-inverting input of amplifier 68. The inverting input of amplifier 68 is connected to the first end of park voltage source 50. The second end of park voltage source 50 is connected to the output of amplifier 58 and to the second end of VCM 56. The output of amplifier 68 is connected to the input of amplifier 58 and the input of inverting amplifier 60. The output of inverting amplifier 60 is connected to the input of amplifier 52.

The resistance of resistor 62 is selected so that it is a multiple K of the sense resistor 54. Similarly, the resistance of resistor 64 is selected so that it is a multiple K of the resistance of VCM 56. Typically sense resistor 54 is on the order of 1 ohm and the resistance of VCM 56 is on the order of 10 ohms. k can then be on the order of 1,000 which would give resistor 62 a value of 1 K-ohm and resistor 64 a value of 10 K-ohms. It will be obvious to a person skilled in the art that any number of K values can be selected to match the particular impedance characteristics of the amplifier 66.

In operation, the current through VCM 56 is controlled by the amplifier bridge configured by amplifier 52, inverting amplifier 60, and amplifier 58. During the park operation, a park voltage is supplied by the park voltage source 50 to the VCM 56. A feedback loop created by amplifier 66, resistor 62, resistor 64, and amplifier 68 compensates the circuit for the voltage drop due to the resistive component of the VCM 56 by adding the voltage drop due to the resistive component back into the park voltage source. By adding the VCM resistive drop into the park voltage 50, the park voltage is forced to be equal to the BEMF of VCM 56 so that the park velocity is constant.

More specifically the feed back circuit is a scaling circuit which, in general terms, senses the voltage drop across the sense resistor 54 and then scales the voltage in proportion to the resistances of the VCM 56 to the sense resistor 54 as described above. Consequently, the voltage at the output of the feedback loop (amplifier 66) is approximately equal to the voltage at the output of amplifier 52 minus the sum of the voltage drops due to the resistive component of the VCM 56 and the sense resistor 54. The output of the feedback loop (amplifier 66) is compared to the park voltage of park voltage source 50 by amplifier 68. Consequently, the voltage at the output of amplifier 68 drives amplifiers 52 and 58 in order to achieve a voltage equal to the park voltage plus the resistive voltage drop across VCM 56 and the voltage drop across sense resistor 54. By comparing the feedback voltage to the park voltage, the park voltage is substantially equal to the BEMF of VCM 56, which ensures a controlled velocity. Also, the feedback loop ensures a faster settling time at the controlled velocity.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A circuit for retracting a plurality of heads in a disk drive comprising:

a voice coil motor for moving the heads, the voice coil motor having a first end and a second end;

a sense resistor for sensing the current in the voice coil motor, the sense resistor having a first end connected to the second end of the voice coil motor, and having a second end connected to a voltage reference;

a park voltage source for energizing the voice coil motor to a landing zone, the park voltage source having a first end connected to first end of the voice coil motor and having a second end; and a scaling circuit, comprising:

an operational amplifier having a non-inverted input connected to the first end of the sense resistor, having an inverting input, and having an output;

a first resistor having a first end connected to the inverting input of the operational amplifier and having a second end connected to the voltage reference; and a second resistor having a first end connected to the output of the operational amplifier and to the second end of the park voltage source, and having a second end connected to the inverting input of the operational amplifier and to the first end of the first resistor.

2. The circuit of claim 1 wherein the ratio of the first resistor to the second resistor is equal to the ratio of the resistance of the voice coil motor to a resistance of the sense resistor.

3. A circuit for retracting a plurality of heads in a disk drive comprising:

a means for moving the heads in the disk drive having a first end and a second end;

a means for sensing the current flowing through the means for moving the heads having a first end connected to the second end of means for moving the heads, and having a second end connected to a voltage reference voltage;

a park voltage source for energizing the voice coil motor to a landing zone, the park voltage source having a first end connected to first end of the voice coil motor and having a second end; and a means for adding a resistive voltage drop of the voice coil to the park voltage source voltage, wherein said means for adding a resistive voltage drop comprises:

an operational amplifier having a non-inverted input connected to the first end of the means for sensing the current, having an inverting input, and having an output;

a first resistor having a first end connected to the inverting input of the operational amplifier and having a second end connected to the voltage reference; and a second resistor having a first end connected to the output of the operational amplifier and to the second end of the park voltage source, and having a second end connected to the inverting input of the operational amplifier and to the first end of the first resistor.

4. The circuit of claim 3 wherein the means for adding a resistive drop of the voice coil comprises a scaling circuit.

5. The circuit of claim 4 wherein the ratio of the first resistor to the second transistor is equal to the ratio of the resistance of the voice coil motor to a resistance of the sense resistor.

6. A circuit for retracting a plurality of heads in a disk drive comprising:

a voice coil motor for moving the plurality of heads, the voice coil motor having a first end and a second end;

a sense resistor for sensing the a current in the voice coil motor, the sense resistor having a first end and having a second end connected to the first end of the voice coil motor;

a first amplifier having an input and having an output connected to the first end of the sense resistor;

a second amplifier having an input and having an output connected to the second end of the voice coil motor;

an inverting amplifier having an output connected to the input of the first amplifier and having an input connected to the input of the second amplifier, the first, second, and inverting amplifier are configured so that the voice coil is energized responsive to a signal on the input of the second amplifier;

a park voltage source having a first end connected to the second end of the voice coil and to the output of the second amplifier, and having a second end;

a third amplifier having an inverting input connected to the second end of the park voltage, having an output connected to the input of the second amplifier and to the input of the inverting amplifier, and having a non-inverting input; and a scaling circuit comprising;

a fourth operational amplifier having a non-inverting input connected to the second end of the sense resistor, having an inverted input, and having an output coupled to the non-inverting input of the third amplifier, a first resistor having a first end connected to the first end of the sense resistor and having a second end connected the inverting input of the fourth operational amplifier; and a second resistor having a first end connected to the second end of the first resistor and to the inverting input of the fourth operational amplifier, and having a second end connected to the output of the fourth operational amplifier and to the non-inverting input of the third amplifier.

7. The circuit of claim 6 wherein the ratio of a resistance of the first resistor to a resistance of the second resistor is similar to a ratio of a resistance of the voice coil motor to a resistance of the sense resistor.

8. A circuit for retracting a plurality of heads in a disk drive comprising:

a means for moving heads the plurality of heads having a first end and having a second end;

a means for sensing a current in the voice coil motor having a first end and having a second end connected to the first end of the means for moving the plurality of heads;

a first amplifier having an input and having an output connected to the first end of the sense resistor;

a second amplifier having an input and having an output connected to the second end of the voice coil motor;

a means for inverting having an output connected to the input of the first amplifier and having an input connected to the input of the second amplifier, the first, second, and inverting amplifier are configured so that the means for moving the plurality of heads is energized responsive to a signal on the input of the second amplifier;

a park voltage source having a first end connected to the second end of the means for moving the plurality of heads and to the output of the second amplifier, and having a second end;

a third amplifier having an inverting input connected to the second end of the park voltage source, having an output connected to the input of the second amplifier and to the input of the inverting amplifier, and having a non-inverting input; and a scaling circuit comprising:

a fourth operational amplifier having a non-inverted input connected to the second end of the means for sensing a current, having an inverted input, and having an output coupled to the non-inverting input of the third amplifier;

a first resistor having a first end connected to the first end of the sensing means and having a second end connected the inverting input of the fourth operational amplifier;

a second resistor having a first end connected to the second end of the first resistor and to the inverting input of the fourth operational amplifier, and having a second end connected to the output of the fourth operational amplifier and to the non-inverting input of the third amplifier.

9. The circuit of claim 8 wherein the ratio of a resistance of the first resistor to a resistance of the second resistor is similar to a ratio of a resistance of the means for moving heads to a resistance of the means for sensing the current.

* * * * *